United States Patent
Chen et al.

(10) Patent No.: US 11,114,890 B2
(45) Date of Patent: Sep. 7, 2021

(54) DC UNINTERRUPTIBLE POWER SUPPLY APPARATUS WITH BIDIRECTIONAL PROTECTION FUNCTION

(71) Applicant: DELTA ELECTRONICS, INC., Taoyuan (TW)

(72) Inventors: Sheng-Jian Chen, Taoyuan (TW); Chia-Chang Hsu, Taoyuan (TW); Zong-Jin Chuang, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 16/852,051

(22) Filed: Apr. 17, 2020

(65) Prior Publication Data
US 2021/0175740 A1    Jun. 10, 2021

(30) Foreign Application Priority Data
Sep. 4, 2019    (CN) .......................... 201910831175.X

(51) Int. Cl.
*H02J 9/06*    (2006.01)
*H02J 7/00*    (2006.01)
*H02H 7/20*    (2006.01)
*H02J 7/34*    (2006.01)

(52) U.S. Cl.
CPC .............. *H02J 9/061* (2013.01); *H02H 7/20* (2013.01); *H02J 7/0029* (2013.01); *H02J 7/345* (2013.01); *H02J 2207/20* (2020.01)

(58) Field of Classification Search
CPC ........ H02J 9/061; H02J 7/345; H02J 2207/20; H02J 7/0031; H02J 7/0034; H02J 7/0068; H03J 7/0029; H02H 7/20; G06F 1/30; G06F 1/305
See application file for complete search history.

(56) References Cited

U.S. PATENT DOCUMENTS 9,490,663 B1    11/2016  Kim et al.
9,831,715 B2 *  11/2017  Zeuch ..................... H02H 3/087
10,303,231 B2 * 5/2019   Matsuda ................. G06F 1/263

OTHER PUBLICATIONS

European Search Report dated Aug. 26, 2020 in EP Application No. 20170588.6, 7 pages.

* cited by examiner

*Primary Examiner* — Ryan Johnson
(74) *Attorney, Agent, or Firm* — Muncy, Geissler, Olds & Lowe, P.C.

(57) ABSTRACT

A DC uninterruptible power supply apparatus with bidirectional protection function receives a DC power source and supplies power to a DC load. The DC uninterruptible power supply apparatus includes a first loop, a second loop, a third loop, and a control unit. The first loop receives the DC power source and supplies power to the DC load. The second loop converts the DC power source into an energy-storing power source to charge an energy-storing unit. The energy-storing unit provides a backup power source to the DC load through the third loop and the first loop. The control unit controls the first loop, the second loop, and the third loop to correspondingly provide a first protection mechanism, a second protection mechanism, and a third protection mechanism.

19 Claims, 5 Drawing Sheets

DC UNINTERRUPTIBLE POWER SUPPLY APPARATUS WITH BIDIRECTIONAL PROTECTION FUNCTION

BACKGROUND

Technical Field

The present disclosure relates to a DC uninterruptible power supply apparatus with bidirectional protection function, and more particularly to a DC uninterruptible power supply apparatus with bidirectional protection function for main working components.

Description of Related Art

The statements in this section merely provide background information related to the present disclosure and do not necessarily constitute prior art.

With the rapid development of the information industry and high-tech industry, most of the precision electronic instruments and equipment need to rely on high-quality power supply to maintain normal operation. In various power supply manners, the uninterruptible power supply can provide high-quality power supply in addition to ensure that the power supply will not be powered off so the uninterruptible power supply has become the best solution for providing high-quality power supply today. The uninterruptible power supply is widely used in network communication equipment, data centers, and some important information equipment.

The safety protection of the DC uninterruptible power system is more important than the safety protection of the AC uninterruptible power system. The reason is that the input and output components of the DC uninterruptible power system have the directivity of the positive and negative polarities of the power supply, and the AC uninterruptible power system has no such issue. However, most of the existing technologies are the focus of the AC uninterruptible power system so that the DC uninterruptible power system does not have an obvious and effective safety protection design. In addition to the safety protection of the input end of the DC power system, the safety protection of the main working components such as the output end, the charging unit, and the battery is also important.

Therefore, how to design a DC uninterruptible power supply apparatus with bidirectional protection function to avoid the risk of the DC uninterruptible power system caused by damage or accidental installation of the main working components is a major research topic of the inventor of the present disclosure.

SUMMARY

In order to solve the above-mentioned problems, a DC uninterruptible power supply apparatus with bidirectional protection function is provided. The DC uninterruptible power supply apparatus with bidirectional protection function receives a DC power source and supplies power to a DC load. The DC uninterruptible power supply apparatus includes a first loop, a second loop, a third loop, and a control unit. The first loop receives the DC power source and supplies power to the DC load. The second loop receives the DC power source and converts the DC power source into an energy-storing power source to charge an energy-storing unit. The third loop is coupled to the first loop and the energy-storing unit, and the energy-storing unit provides a backup power source to the DC load through the third loop and the first loop. The control unit controls the first loop, the second loop, and the third loop to be connected or disconnected for correspondingly providing a first protection mechanism, a second protection mechanism, and a third protection mechanism. The first protection mechanism provides protection when the DC power source is reversely connected, the DC load is reversely connected, the DC power source is short circuit to ground, or the DC load is short circuit to ground, the second protection mechanism provides protection when the second loop occurs a first abnormal condition, and the third protection mechanism provides protection when the third loop occurs a second abnormal condition.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawings as follows.

DETAILED DESCRIPTION

Figure 1:
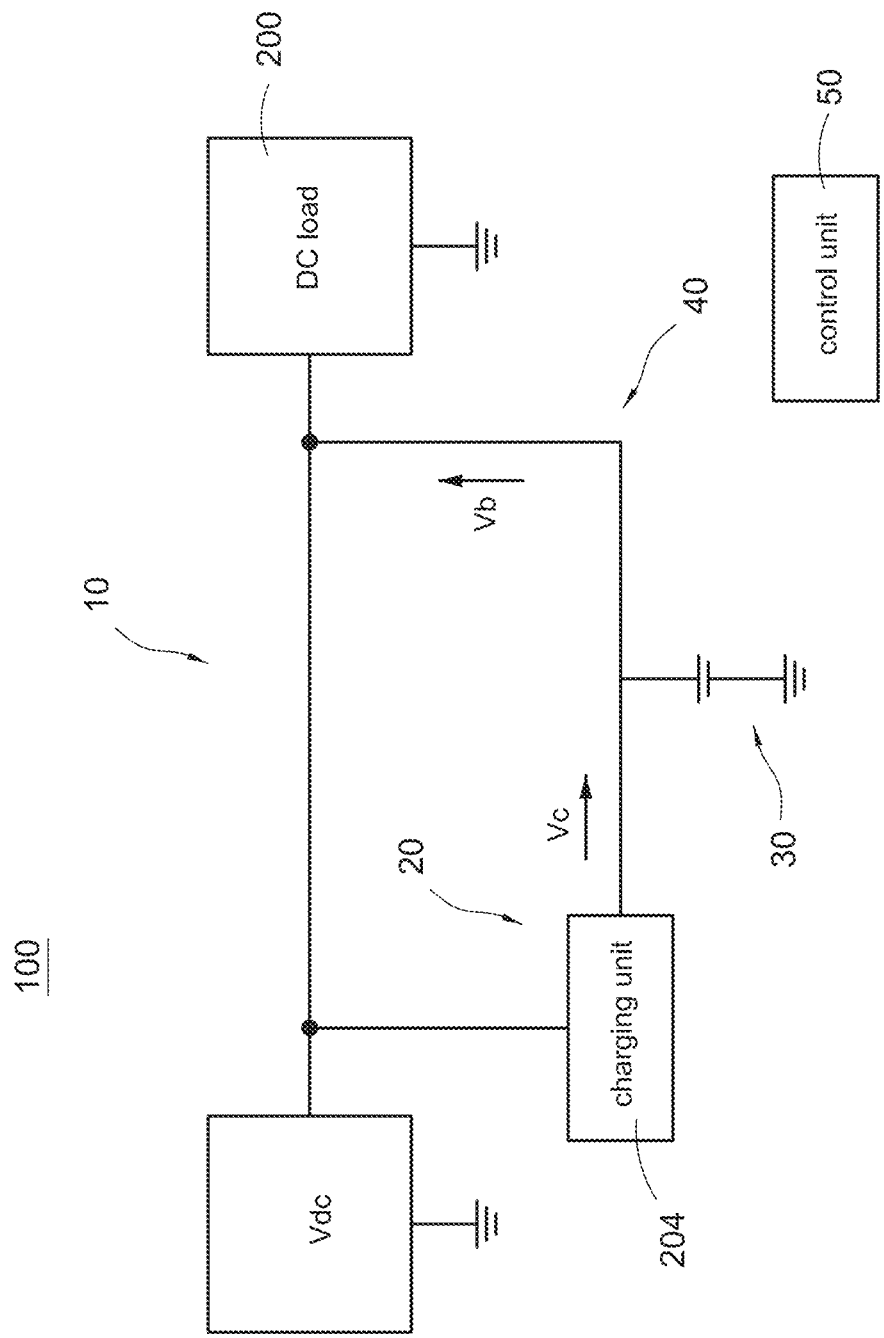
FIG. 1 is a block circuit diagram of a DC uninterruptible power supply apparatus with bidirectional protection function according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of a DC uninterruptible power supply apparatus with bidirectional protection function according to the present disclosure. The DC uninterruptible power supply apparatus 100 receives a DC power source Vdc and supplies power to a DC load 200. The DC uninterruptible power supply apparatus 100 includes a first loop 10, a second loop 20, an energy-storing unit 30, a third loop 40, and a control unit 50. The first loop 10 receives the DC power source Vdc and supplies power to the DC load 200. The second loop 20 includes a charging unit 204, and the charging unit 204 receives the DC power source Vdc and is coupled to the energy-storing unit 30. The charging unit 204 converts the DC power source Vdc into an energy-storing power source Vc, and provides the energy-storing power source Vc to charge the energy-storing unit 30. The third loop 40 is coupled between the first loop 10 and the energy-storing unit 30, and the energy-storing unit 30 provides the backup power source Vb to the DC load 200 through the third loop 40 and the first loop 10. When the DC power source Vdc is available and the control unit 50 controls the first loop 10 and the second loop 20 to be connected, the DC power source Vdc is provided to the DC load 200 through the first loop 10, and simultaneously the DC power source Vdc is converted into the energy-storing power source Vc through the second loop 20. When the DC power source Vdc is not available and the control unit 50 controls the first loop 10 and the third loop 40 to be connected, the energy-storing unit 30 provides the backup power source Vb to the DC load 200 through the third loop 40 and the first loop 10. The control unit 50 controls the first loop 10 to be connected or disconnected to provide a first protection mechanism, controls the second loop 20 to be connected or disconnected to provide a second protection mechanism, and controls the third loop 40 to be connected or disconnected to provide a third protection mechanism.

Further, since the DC power source Vdc, the DC load 200, and the energy-storing unit 30 of the DC uninterruptible power supply apparatus 100 are externally connected, and the power source has the positive and negative polarities. If the staff is slightly careless during the installation, it is easy to cause the positive and negative polarities to reverse so that positive and negative polarities accidentally touch and short circuit. In addition, if the installation conditions of the components are not known, and the installed components are just damaged due to the short circuit to ground, the risk of damage to other components may occur. Therefore, the main object of the present disclosure is to provide protection of internal and external components in the DC uninterruptible power supply apparatus 100 to prevent the risk of damage to the uninterruptible power supply apparatus itself or external components.

Specifically, the first protection mechanism mainly provides a bidirectional protection when the DC power source Vdc or the DC load 200 is abnormal, such as the DC power source Vdc is reversely connected, the DC load 200 is reversely connected, the DC power source Vdc is short circuit to ground, or the DC load 200 is short circuit to ground, so that the first loop 10 is disconnected to provide the first protection mechanism to avoid damaging other components. The second protection mechanism mainly provides a bidirectional protection between the DC power source Vdc and the energy-storing unit 30 when the second loop 20 occurs a first abnormal condition. The first abnormal condition includes abnormalities such as short circuit, open circuit, over current, over voltage, under voltage, etc. of the charging unit 204, or the DC power source Vdc is reversely connected, the DC power source Vdc is short circuit to ground, the energy-storing unit 30 is reversely connected, the energy-storing unit 30 is short circuit to ground, or the power stored in the energy-storing unit 30 is higher or lower than a normal range. When the above-mentioned abnormal condition occurs, the second loop 20 is disconnected to provide the second protection mechanism to avoid damaging other components, such as the DC power source Vdc, the charging unit 204, and the energy-storing unit 30. The third protection mechanism mainly provides a bidirectional protection between the energy-storing unit 30 and the first loop 10 when the third loop 40 occurs a second abnormal condition. The second abnormal condition includes abnormalities such as the energy-storing unit 30 is reversely connected, the energy-storing unit 30 is short circuit to ground, the first loop 10 is short circuit to ground. When the above-mentioned abnormal condition occurs, the third loop 40 is disconnected to provide the third protection mechanism to avoid damaging other components.

Figure 2A:
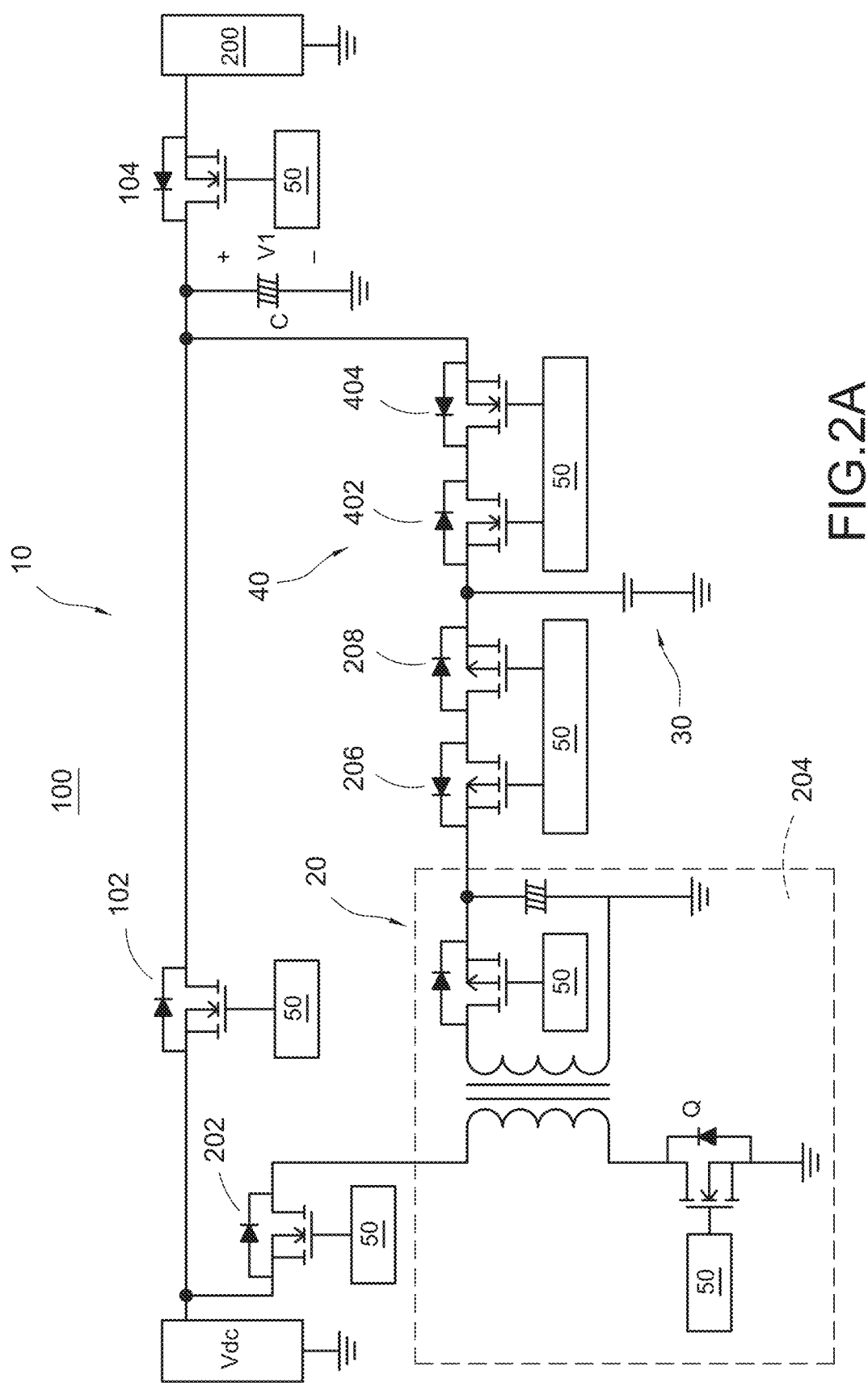
FIG. 2A is a block circuit diagram of the DC uninterruptible power supply apparatus according to a first embodiment of the present disclosure.

Please refer to FIG. 2A, which shows a block circuit diagram of the DC uninterruptible power supply apparatus according to a first embodiment of the present disclosure, and also refer to FIG. 1. The first loop 10 includes a first path blocking component 102 and a first switch 104. In particular, the first path blocking component 102 and the first switch 104 are semiconductor components controlled by the control unit 50. One end of the first path blocking component 102 is coupled to the DC power source Vdc and another end of the first path blocking component 102 is coupled to one end of the first switch 104 and the third loop 40. Another end of the first switch 104 is coupled to the DC load 200, and the control unit 50 is coupled to a control end of the first path blocking component 102 and a control end of the first switch 104. The first path blocking component 102 and the first switch 104 are coupled in series with the same polarity. For example, the first path blocking component 102 and the first switch 104 are both field effect transistors, and a drain of the first path blocking component 102 is coupled to a drain of the first switch 104. When the control unit 50 detects that the DC power source Vdc is reversely connected or the DC power source Vdc is short circuit to ground, the control unit 50 controls the first path blocking component 102 to be turned off so that the first loop 10 is disconnected. When the control unit 50 detects that the DC load 200 is reversely connected or the DC power source Vdc is short circuit to ground, the control unit 50 controls the first switch 104 to be turned off so that the first loop 10 is disconnected.

The second loop 20 includes a second path blocking component 202, a charging unit 204, a second switch 206, and a third path blocking component 208. In particular, the second path blocking component 202, the second switch 206, and the third path blocking component 208 are semiconductor components controlled by the control unit 50, and the charging unit 204 is a DC-to-DC conversion unit controlled by the control unit 50. One end of the second path blocking component 202 is coupled to the DC power source Vdc and another end of the second path blocking component 202 is coupled to one end of the charging unit 204. The other end of the charging unit 204 is coupled to one end of the second switch 206, another end of the second switch 206 is coupled to one end of the third path blocking component 208, and another end of the third path blocking component 208 is coupled to the energy-storing unit 30. The charging unit 204 may be, for example but not limited to, a boost conversion unit, a buck conversion unit, a buck-boost conversion unit, a flyback conversion unit, a forward conversion unit, or an LLC resonant conversion unit. In this embodiment, the flyback conversion unit is used as an illustrative example. A power switch Q is inside any one of the above-mentioned conversion units. One end of the power switch Q is coupled to another end of the second path blocking component 202, and the control unit 50 controls switching the power switch Q to convert the DC power source Vdc into the energy-storing power source Vc. The second path blocking component 202 and the power switch Q are coupled in series with the same polarity. For example, the second path blocking component 202 and the power switch Q are both field effect transistors, and a drain of the second path blocking component 202 is coupled to a drain of the power switch Q. The second switch 206 and the third path blocking component 208 are coupled in series with the same polarity. For example, the second switch 206 and the third path blocking component 208 are both field effect transistors. In one embodiment, as shown in FIG. 2A, a drain of the second switch 206 is coupled to a drain of the third path blocking component 208. In another embodiment, not shown in FIG. 2A, a source of the second switch 206 is coupled to a source of the third path blocking component 208, that is, the drain of the second switch 206 is coupled to the energy-storing unit 30 and the drain of the third path blocking component 208 is coupled to the charging unit 204.

Furthermore, in the DC uninterruptible power supply apparatus 100, a path between two main working components has two opposite blocking components (or switches). In particular, the main working components include the DC power source Vdc, the energy-storing unit 30, and the DC load 200. Since a path between the DC power source Vdc and the charging unit 204 has a power switch Q inside the converter unit, the power switch Q can be used to determine whether the loop is connected or disconnected. Therefore, the path between the DC power source Vdc and the charging unit 204 only needs to include one second path blocking component 202 to achieve the bidirectional protection function. When the control unit 50 detects that the first abnormal condition due to the DC power source Vdc is reversely connected or the DC power source Vdc is short circuit to ground, the control unit 50 controls the second path blocking component 202 to be turned off so that the second loop 20 is disconnected. When the control unit 50 detects that the charging unit 204 occurs the first abnormal condition such as the an input/output short circuit to ground of the charging unit 204, output overcurrent, output overvoltage, or so on, the control unit 50 controls the charging unit 204 to activate a self-protection mechanism such as overcurrent protection, short circuit protection, overvoltage protection, or so on, and also turns off the power switch Q to avoid damaging the energy-storing unit 30 due to the abnormality of the charging unit 204 by turning off the second switch 206 and the third path blocking component 208 to disconnect the second loop 20. Specifically, when the charging unit 204 occurs the first abnormal condition due to the output overvoltage, the charging unit 204 activates the self-protection mechanism and the control unit 50 also controls the second switch 206 to be turned off. When the charging unit 204 occurs the first abnormal condition due to the short circuit to ground or the output overcurrent, the charging unit 204 activates the self-protection mechanism and the control unit 50 also controls the third path blocking component 208 to be turned off. In addition, when the control unit 50 detects that the first abnormal condition occurs due to the voltage of the energy-storing power source Vc is higher than a normal range, the control unit 50 controls the third path blocking component 208 to be turned off so that the second loop 20 is disconnected. Alternatively, when the control unit 50 detects that the first abnormal condition due to the voltage of the energy-storing power source Vc is lower than the normal range, the energy-storing unit 30 is short circuit to ground, or the energy-storing unit 30 is reversely connected, the control unit 50 controls the second switch 206 to be turned off so that the second loop 20 is disconnected.

The third loop 40 includes a fourth path blocking component 402 and a third switch 404. In particular, the fourth path blocking component 402 and the third switch 404 are semiconductor components controlled by the control unit 50. One end of the fourth path blocking component 402 is coupled to the energy-storing unit 30 and another end of the fourth path blocking component 402 is coupled to one end of the third switch 404. Another end of the third switch 404 is coupled to the first loop 10, and the control unit 50 is coupled to a control end of the fourth path blocking component 402 and a control end of the third switch 404. The fourth path blocking component 402 and the third switch 404 are coupled in series with the same polarity. For example, the fourth path blocking component 402 and the third switch 404 are both field effect transistors. In one embodiment, as shown in FIG. 2A, a drain of the fourth path blocking component 402 is coupled to a drain of the third switch 404. In another embodiment, not shown in FIG. 2A, a source of the fourth path blocking component 402 is coupled to a source of the third switch 404, that is, the drain of the fourth path blocking component 402 is coupled to the first loop 10 and the drain of the third switch 404 is coupled to the energy-storing unit 30. When the control unit 50 detects that the second abnormal condition occurs, including the energy-storing unit 30 is reversely connected or the energy-storing unit 30 is short circuit to ground, the control unit 50 controls the fourth path blocking component 402 to be turned off so that the third loop 40 is disconnected.

Also refer to FIG. 2A, an energy-storing capacitor C may be coupled between the first path blocking component 102 and the first switch 104. When the DC power source Vdc is not reversely connected and the first path blocking component 102 is turned on, the DC power source Vdc charges the energy-storing capacitor C. When a first voltage V1 established on the energy-storing capacitor C is charged to be greater than or equal to a predetermined voltage, it means that the power source provided from the first voltage V1 has been established. At this condition, the DC load 200 can directly acquire the first voltage V1 to avoid slowly accumulating enough power to operate when the first path blocking component 102 is turned on. Therefore, when the control unit 50 detects that the first voltage V1 of the energy-storing capacitor C is greater than or equal to the predetermined voltage, the control unit 50 controls the first switch 104 to be turned on to eliminate the risk that the DC load 200 is out of control when the power source has not been stabilized, and to ensure the stability of the operation of the DC load 200. In one embodiment, when the energy-storing capacitor C occurs the second abnormal condition of short circuit to ground, the control unit 50 controls the third switch 404 to be turned off so that the third loop 40 is disconnected to avoid damaging the energy-storing unit 30 due to abnormality of the energy-storing capacitor C. In one embodiment, when the DC power source Vdc normally supplies power to the DC load 200 without using the energy-storing unit 30, the control unit 50 controls the third switch 404 to be turned off to avoid additional consumption of energy stored in the energy-storing unit 30.

Figure 2B:
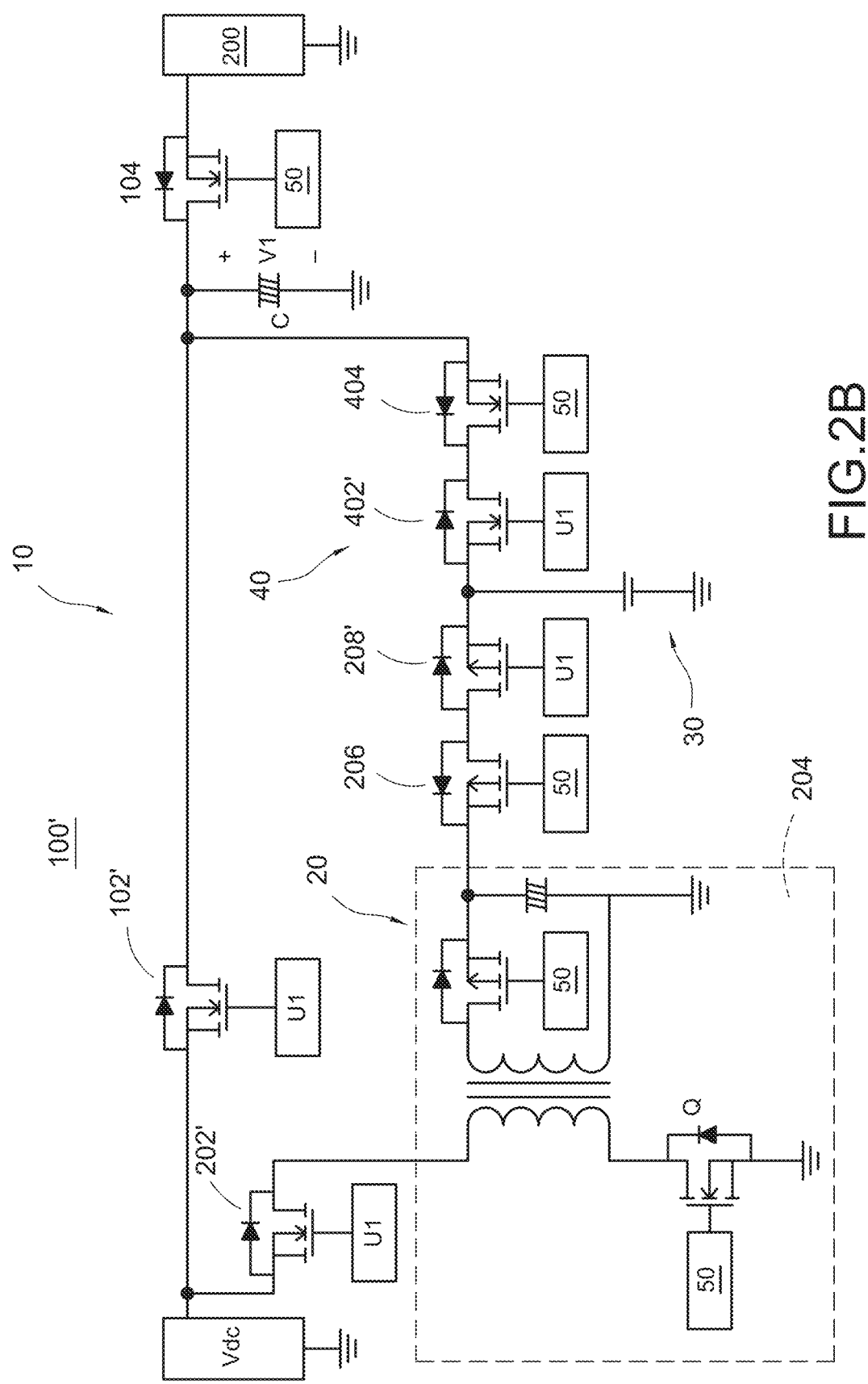
FIG. 2B is a block circuit diagram of the DC uninterruptible power supply apparatus according to a second embodiment of the present disclosure.

Please refer to FIG. 2B, which shows a block circuit diagram of the DC uninterruptible power supply apparatus according to a second embodiment of the present disclosure, and also refer to FIG. 1 to FIG. 2A. The difference between the DC uninterruptible power supply apparatus 100' shown in FIG. 2B and the DC uninterruptible power supply apparatus 100 shown in FIG. 2A is that the path blocking components 102',202',208',402' are not controlled by the control unit 50 but used through a self-driving switch unit, for example but not limited to, an Oring transistor collocated with a self-driving controller U1. The self-driving switch unit self-detects a voltage across two ends of the switch by the self-driving controller U1. When the voltage across two ends of the switch meets the turned-on condition (for example, a voltage at one end is higher than a voltage at the other end), the self-driving switch unit is turned on by a self-driving manner. That is, the first path blocking component 102' and the second path blocking component 202' are self-driving turned on when the DC power source Vdc is not reversely connected and is not short circuit to ground, the third path blocking component 208' is self-driving turned on when the first abnormal condition does not occur including the charging unit 204 is short circuit to ground, the output overcurrent, and the energy-storing power source Vc is higher than the normal range, and the fourth path blocking component 402' is self-driving turned on when the second abnormal condition does not occur including the energy-storing unit 30 is reversely connected and is short circuit to ground. The second switch 206 and the third path blocking component 208' are coupled in series with the same polarity. In one embodiment, as shown in FIG. 2B, a drain of the second switch 206 is coupled to a drain of the third path blocking component 208'. In another embodiment, not shown in FIG. 2B, a source of the second switch 206 is coupled to a source of the third path blocking component 208', that is, the drain of the second switch 206 is coupled to the energy-storing unit 30 and the drain of the third path blocking component 208' is coupled to the charging unit 204. The fourth path blocking component 402' and the third switch 404 are coupled in series with the same polarity. In one embodiment, as shown in FIG. 2B, a drain of the third switch 404 is coupled to a drain of the fourth path blocking component 402'. In another embodiment, not shown in FIG. 2B, a source of the third switch 404 is coupled to a source of the fourth path blocking component 402', that is, the drain of the third switch 404 is coupled to the energy-storing unit 30 and the drain of the fourth path blocking component 402' is coupled to the first loop 10. Other circuit components and control methods not mentioned are the same as those in FIG. 2A, and will not be further described herein.

Figure 2C:
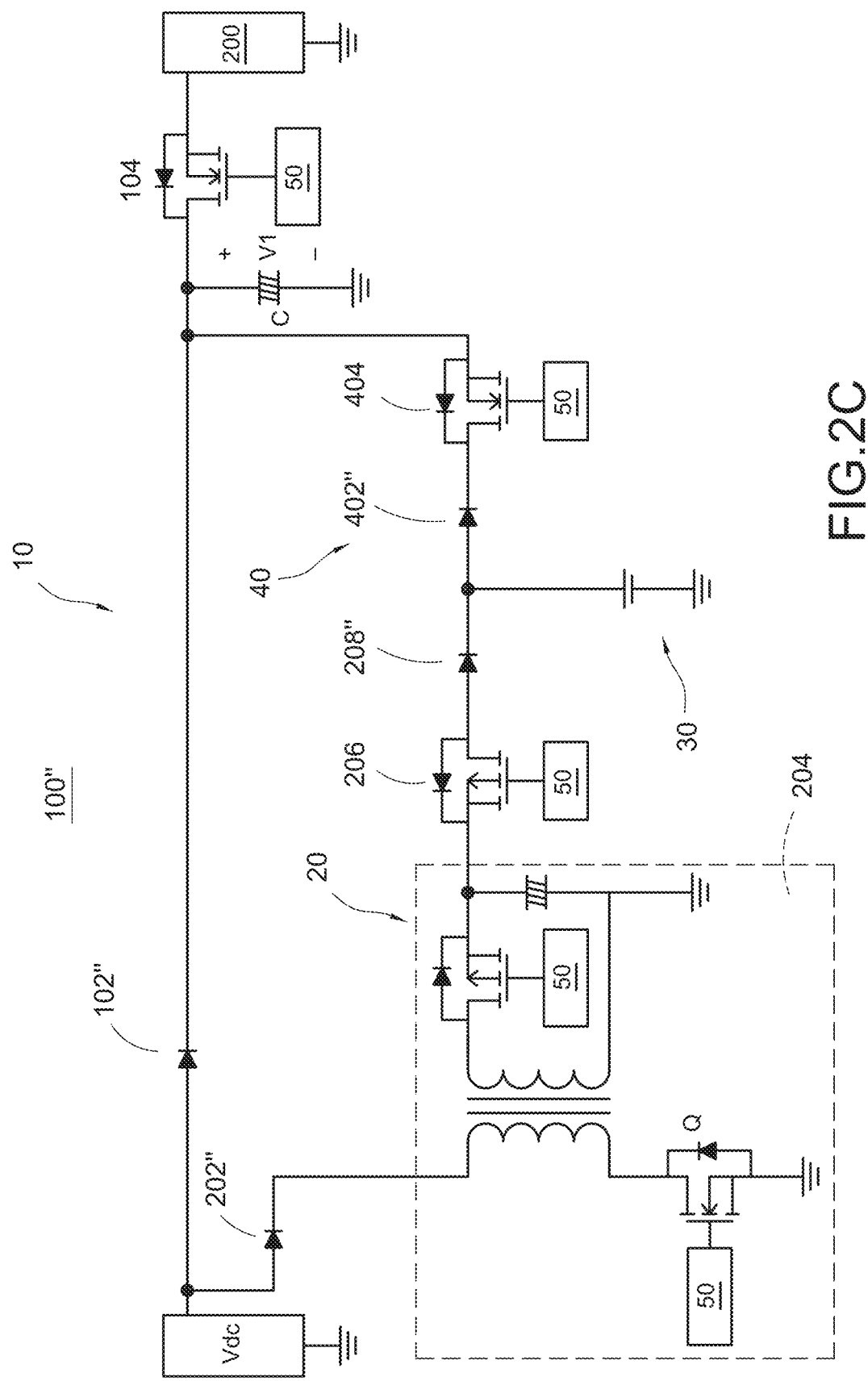
FIG. 2C is a block circuit diagram of the DC uninterruptible power supply apparatus according to a third embodiment of the present disclosure.

Please refer to FIG. 2C, which shows a block circuit diagram of the DC uninterruptible power supply apparatus according to a third embodiment of the present disclosure, and also refer to FIG. 1 to FIG. 2B. The difference between the DC uninterruptible power supply apparatus 100" shown in FIG. 2C and the DC uninterruptible power supply apparatus 100 shown in FIG. 2A is that the path blocking components 102",202",208",402" are not controlled by the control unit 50 but used through a passive diode. The forward-bias turned on or reverse-bias turned off of the diode is determined according a voltage across two ends of the diode so as to decide whether the loops (10,20,40) are connected or disconnected. Specifically, an anode of the first path blocking component 102" is coupled to the DC power source Vdc and a cathode of the first path blocking component 102" is coupled to the first switch 104. When the DC power source Vdc is reversely connected or the DC power source Vdc is short circuit to ground, the first path blocking component 102" is turned off due to reverse bias. An anode of the second path blocking component 202" is coupled to the DC power source Vdc and a cathode of the second path blocking component 202" is coupled to the power switch Q. When the DC power source Vdc is reversely connected or the DC power source Vdc is short circuit to ground, the second path blocking component 202" is turned off due to reverse bias. In one embodiment, as shown in FIG. 2C, an anode of the third path blocking component 208" is coupled to the second switch 206 and a cathode of the third path blocking component 208" is coupled to the energy-storing unit 30. In another embodiment, not shown in FIG. 2C, the cathode of the third path blocking component 208" is coupled to the second switch 206 and the anode of the third path blocking component 208" is coupled to the charging unit 204. When the first abnormal condition occurs including the charging unit 204 is short circuit to ground, the output overcurrent, and the energy-storing power source Vc is higher than the normal range, the third path blocking component 208" is turned off due to reverse bias. In one embodiment, as shown in FIG. 2C, an anode of the fourth path blocking component 402" is coupled to the energy-storing unit 30 and a cathode of the fourth path blocking component 402" is coupled to the third switch 404. In another embodiment, not shown in FIG. 2C, the cathode of the fourth path blocking component 402" is coupled to the first loop 10 and the anode of the fourth path blocking component 402" is coupled to the third switch 404. When the energy-storing unit 30 occurs the second abnormal condition of reversely connected or short circuit to ground, the fourth path blocking component 402" is turned off due to reverse bias.

In one embodiment, since internal junction of the semiconductor components (field effect transistor (FET), self-driving switch unit, etc.) shown in FIG. 2A to FIG. 2C is combined to generate a junction diode (P-N junction diode), the semiconductor components still produce leakage current in a specific direction even if the semiconductor components are controlled or self-driven and a specific voltage difference across the semiconductor component. Therefore, although the semiconductor component is in the turned-off state, the junction diode is still turned on due to forward bias. In the present disclosure, therefore, at least two semiconductor components of opposite polarities are connected in series in each loop (10, 20, 40) so that the leakage current can be blocked regardless of the current direction of each loop (10, 20, 40). It is to avoid leakage current in a certain loop (10, 20, 40) to cause the risk of damage to other normal components due to accidental installation of the main working components by the staff or damaged installation components.

Figure 3:
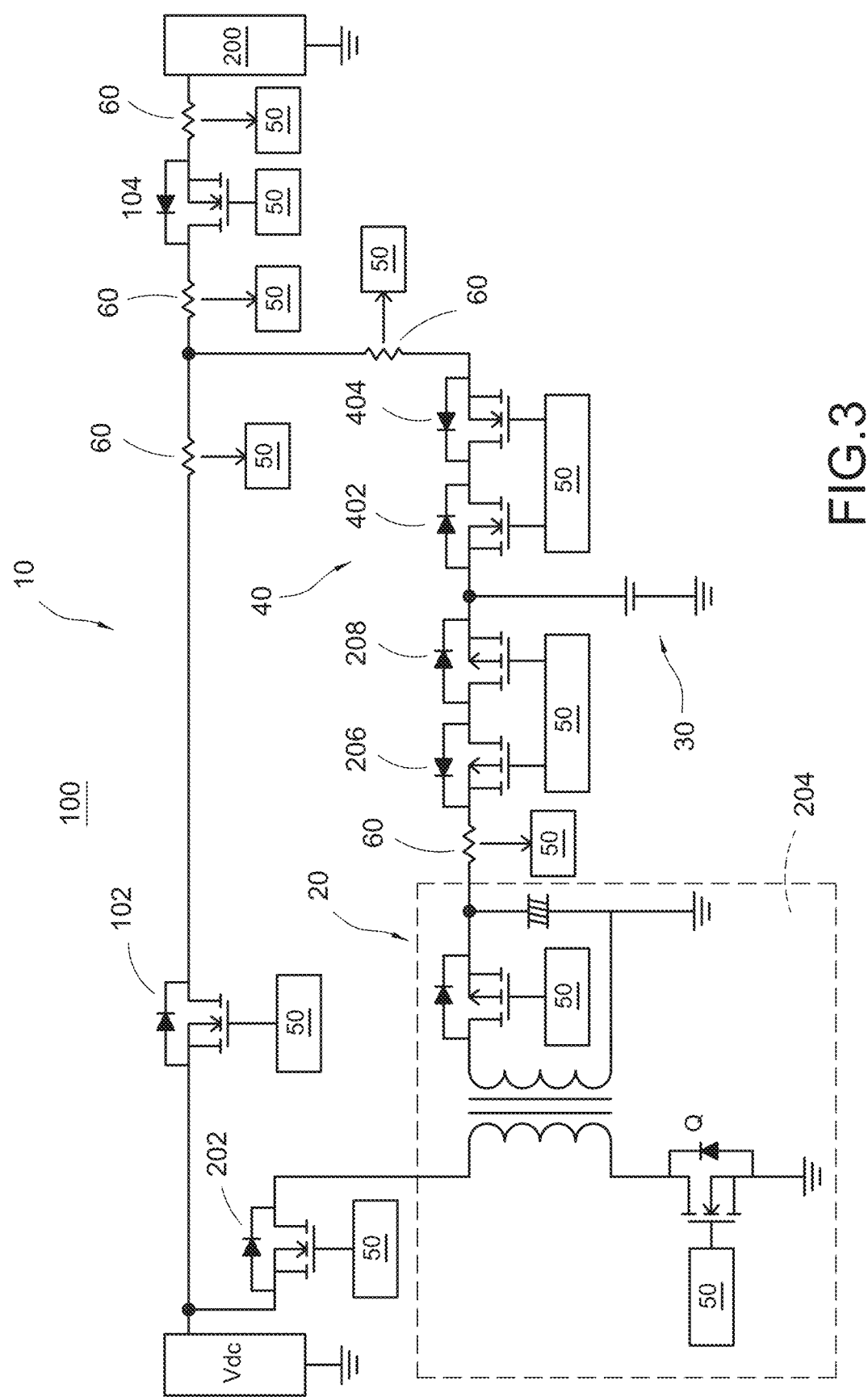
FIG. 3 is a block circuit diagram of the DC uninterruptible power supply apparatus cooperated with a current-detecting unit according to the present disclosure.

Please refer to FIG. 3, which shows a block circuit diagram of the DC uninterruptible power supply apparatus cooperated with a current-detecting unit according to the present disclosure, and also refer to FIG. 1 to FIG. 2C. In order to know the occurrence of the abnormal conditions as described above, a detection mechanism is needed to detect the conditions on the power loops, and detection points can be adjusted according to practical considerations (such as cost, importance, etc.). As shown in FIG. 3, a current-detecting unit 60 can be separately disposed between an intersection of the first loop 10 and the third loop 40 and the first switch 104, or disposed between the first switch 104 and the DC load 200 to simultaneously monitor the conditions of the first loop 10 and the third loop 40. The current-detecting units 60 may be disposed on the first loop 10, the second loop 20, and the third loop 40 for respectively monitoring the conditions of the first loop 10, the second loop 20, and the third loop 40. The control unit 50 determines whether the protection mechanism should be activated according to the feedback from the current-detecting unit 60. Also, when the current-detecting units 60 are disposed on the first loop 10, the second loop 20, and the third loop 40, the control unit 50 can perform single loop protection according to the values acquired from the current-detecting units 60 to achieve the segment protection. In one embodiment, the current-detecting unit 60 may be, for example but not limited to, a resistor, and any component that can be used to detect current should be included in the scope of present disclosure.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A DC uninterruptible power supply apparatus with bidirectional protection function configured to receive a DC power source and supply power to a DC load, the DC uninterruptible power supply apparatus comprising:
a first loop configured to receive the DC power source and supply power to the DC load,
a second loop configured to receive the DC power source and convert the DC power source into an energy-storing power source to charge an energy-storing unit, the second loop comprises:
a second path blocking component coupled to the DC power source, and
a charging unit comprising a power switch, the power switch coupled to the second path blocking component,
a third loop coupled to the first loop and the energy-storing unit, and the energy-storing unit configured to provide a backup power source to the DC load through the third loop and the first loop, and
a control unit configured to control the first loop, the second loop, and the third loop to be connected or disconnected for correspondingly providing a first protection mechanism, a second protection mechanism, and a third protection mechanism, the control unit configured to control switching the power switch to convert the DC power source into the energy-storing power source,
wherein the first protection mechanism provides protection when the DC power source is reversely connected, the DC load is reversely connected, the DC power source is short circuit to ground, or the DC load is short circuit to ground, the second protection mechanism provides protection when the second loop occurs a first abnormal condition, and the third protection mechanism provides protection when the third loop occurs a second abnormal condition, and
wherein when the first abnormal condition occurs including the DC power source is reversely connected or the DC power source is short circuit to ground, the second loop is disconnected; when the charging unit activates a self-protection mechanism, the control unit is configured to control the power switch to be turned off.

2. The DC uninterruptible power supply apparatus in claim 1, wherein the first loop comprises:
a first path blocking component coupled to the DC power source, and
a first switch coupled to the first path blocking component, the third loop, the DC load, and the control unit,
wherein when the DC power source is reversely connected or the DC power source is short circuit to ground, the first path blocking component is turned off so that the first loop is disconnected; when the DC load is reversely connected or the DC load is short circuit to ground, the control unit is configured to control the first switch to be turned off so that the first loop is disconnected.

3. The DC uninterruptible power supply apparatus in claim 2, wherein when the control unit is coupled to the first path blocking component and the control unit detects that the DC power source is reversely connected or the DC power source is short circuit to ground, the control unit is configured to control the first path blocking component to be turned off.

4. The DC uninterruptible power supply apparatus in claim 2, wherein the first path blocking component is a self-driving switch unit; the self-driving switch unit is self-driven turned on when the DC power source is not reversely connected or the DC power source is not short circuit to ground.

5. The DC uninterruptible power supply apparatus in claim 2, wherein the first path blocking component is a diode; an anode of the diode is coupled to the DC power source and a cathode of the diode is coupled to the first switch; when the DC power source is reversely connected or the DC power source is short circuit to ground, the diode is turned off due to reverse bias.

6. The DC uninterruptible power supply apparatus in claim 2, wherein the first loop further comprises:
an energy-storing capacitor coupled to the first path blocking component, the first switch, and the third loop,
wherein when the control unit is configured to detect that a first voltage of the energy-storing capacitor is greater than or equal to a predetermined voltage, the control unit is configured to control the first switch to be turned on.

7. The DC uninterruptible power supply apparatus in claim 1, wherein the control unit is coupled to the second path blocking component, and when the control unit is configured to detect that the first abnormal condition occurs including the DC power source is reversely connected or the DC power source is short circuit to ground, the control unit is configured to control the second path blocking component to be turned off.

8. The DC uninterruptible power supply apparatus in claim 1, wherein the second path blocking component is a self-driving switch unit; the self-driving switch unit is self-driven turned on when the first abnormal condition does not occur including the DC power source is not reversely connected or the DC power source is not short circuit to ground.

9. The DC uninterruptible power supply apparatus in claim 1, wherein the second path blocking component is a diode; an anode of the diode is coupled to the DC power source and a cathode of the diode is coupled to the power switch; when the first abnormal condition occurs including the DC power source is reversely connected or the DC power source is short circuit to ground, the diode is turned off due to reverse bias.

10. The DC uninterruptible power supply apparatus in claim 1, wherein
the second loop further comprises:
a second switch coupled to the charging unit and the control unit, and configured to receive the energy-storing power source, and
a third path blocking component coupled to the second switch and the energy-storing unit,
wherein when the control unit is configured to detect that the first abnormal condition occurs including the charging unit is outputting overvoltage, the energy-storing unit is short circuit to ground, the energy-storing unit is reversely connected, or the energy-storing power source is higher than a normal range, the control unit is configured to control the second switch to be turned off so that the second loop is disconnected; when the first abnormal condition occurs including the charging unit is short circuit to ground, the charging unit is outputting overcurrent, or the energy-storing power source is higher than the normal range, the third path blocking component is turned off so that the second loop is disconnected.

11. The DC uninterruptible power supply apparatus in claim 10, wherein the control unit is coupled to the third path blocking component, and when the control unit is configured to detect that the first abnormal condition occurs including the charging unit is short circuit to ground, the charging unit is outputting overvoltage, or the energy-storing power source is higher than the normal range, the control unit is configured to control the third path blocking component to be turned off.

12. The DC uninterruptible power supply apparatus in claim 10, wherein the third path blocking component is a self-driving switch unit; the self-driving switch unit is self-driven turned on when the first abnormal condition does not occur including the charging unit is not short circuit to ground, the charging unit is not outputting overcurrent, or the energy-storing power source is not higher than the normal range.

13. The DC uninterruptible power supply apparatus in claim 10, wherein the third path blocking component is a diode; an anode of the diode is coupled to the second switch and a cathode of the diode is coupled to the energy-storing unit or a cathode of the diode is coupled to the second switch and an anode of the diode is coupled to the charging unit; when the first abnormal condition occurs including the charging unit is short circuit to ground, the charging unit is outputting overcurrent, or the energy-storing power source is higher than the normal range, the diode is turned off due to reverse bias.

14. A DC uninterruptible power supply apparatus with bidirectional protection function configured to receive a DC power source and supply power to a DC load, the DC uninterruptible power supply apparatus comprising:
a first loop configured to receive the DC power source and supply power to the DC load,
a second loop configured to receive the DC power source and convert the DC power source into an energy-storing power source to charge an energy-storing unit,
a third loop coupled to the first loop and the energy-storing unit, and the energy-storing unit configured to provide a backup power source to the DC load through the third loop and the first loop, the third loop comprising:
a fourth path blocking component coupled to the energy-storing unit, and
a third switch coupled to the fourth path blocking component; and the first loop, and
a control unit configured to control the first loop, the second loop, and the third loop to be connected or disconnected for correspondingly providing a first protection mechanism, a second protection mechanism, and a third protection mechanism,
wherein the first protection mechanism provides protection when the DC power source is reversely connected, the DC load is reversely connected, the DC power source is short circuit to ground, or the DC load is short circuit to ground, the second protection mechanism provides protection when the second loop occurs a first abnormal condition, and the third protection mechanism provides protection when the third loop occurs a second abnormal condition, and
wherein when the second abnormal condition occurs including the energy-storing unit is reversely connected or the energy-storing unit is short circuit to ground, the fourth path blocking component is turned off so that the third loop is disconnected; when the second abnormal condition occurs including the first loop is short circuit to ground, the control unit is configured to control the third switch to be turned off so that the third loop is disconnected.

15. The DC uninterruptible power supply apparatus in claim 14, wherein the control unit is coupled to the fourth path blocking component, and when the second abnormal condition occurs including the energy-storing unit is reversely connected or the energy-storing unit is short circuit to ground, the control unit is configured to control the fourth path blocking component to be turned off.

16. The DC uninterruptible power supply apparatus in claim 14, wherein the fourth path blocking component is a self-driving switch unit; the self-driving switch unit is self-driven turned on when the second abnormal condition does not occur including the energy-storing unit is not reversely connected or the energy-storing unit is not short circuit to ground.

17. The DC uninterruptible power supply apparatus in claim 14, wherein the fourth path blocking component is a diode; a cathode of the diode is coupled to the third switch and an anode of the diode is coupled to the energy-storing unit or an anode of the diode is coupled to the third switch and a cathode of the diode is coupled to the first loop; when the second abnormal condition occurs including the energy-storing unit is reversely connected or the energy-storing unit is short circuit to ground, the diode is turned off due to reverse bias.

18. The DC uninterruptible power supply apparatus in claim 1, further comprising:
a current-detecting unit coupled to the first loop, the second loop, or the third loop in series,
wherein the control unit is configured to determine whether the first protection mechanism, the second protection mechanism, or the third protection mechanism to be provided through the current-detecting unit.

19. The DC uninterruptible power supply apparatus in claim 1, wherein the DC power source is available, and the control unit is configured to control the first loop and the second loop to be turned on, the DC power source is provided to the DC load through the first loop, and the DC power source is converted into the energy-storing power source through the second loop; when the DC power source is not available, and the control unit is configured to control the first loop and the third loop to be turned on, the energy-storing unit is configured to provide the backup power source to the DC load through the first loop and the third loop.

* * * * *